(12) United States Patent
Cramer et al.

(10) Patent No.: US 8,118,085 B2
(45) Date of Patent: Feb. 21, 2012

(54) HEAT EXCHANGER

(75) Inventors: Mark A. Cramer, Castle Rock, CO (US); Kevin B. Akins, Littleton, CO (US); James A. Ehret, Norwalk, OH (US); Dennis K. Klakring, Bella Vista, AR (US); Jerry C. O'Connor, Lakeville, MN (US); Joseph Michael Fazzari, Colville, WA (US)

(73) Assignee: Leprino Foods Company, Denver, CO (US)

( * ) Notice: Subject to any disclaimer, the term of this patent is extended or adjusted under 35 U.S.C. 154(b) by 1051 days.

(21) Appl. No.: 12/026,642

(22) Filed: Feb. 6, 2008

(65) Prior Publication Data

US 2009/0194256 A1    Aug. 6, 2009

(51) Int. Cl.
*F28F 9/26* (2006.01)
*F28F 9/04* (2006.01)

(52) U.S. Cl. ....................... 165/144; 165/178
(58) Field of Classification Search ................. 165/143, 165/144, 150, 162, 178, 173, 175, 176, 67, 165/158

See application file for complete search history.

(56) References Cited

U.S. PATENT DOCUMENTS

| | | | | |
|---|---|---|---|---|
| 1,361,807 A * | 12/1920 | Bares | | 165/76 |
| 1,797,524 A * | 3/1931 | Dwyer | | 165/76 |
| 3,191,673 A * | 6/1965 | Young | | 165/151 |
| 3,422,884 A * | 1/1969 | Otten | | 165/67 |
| 3,475,137 A * | 10/1969 | Kuo et al. | | 422/148 |
| 3,489,209 A * | 1/1970 | Johnson | | 165/133 |
| 3,750,744 A * | 8/1973 | Bouras | | 165/76 |
| 4,095,648 A * | 6/1978 | Shipes | | 165/162 |
| 4,562,697 A * | 1/1986 | Lawson | | 60/599 |
| 4,651,821 A * | 3/1987 | Moranne | | 165/175 |
| 5,190,101 A * | 3/1993 | Jalilevand et al. | | 165/176 |
| 5,836,623 A | 11/1998 | Bothell et al. | | |
| 6,341,650 B2 * | 1/2002 | Carpentier | | 165/176 |
| 6,443,224 B2 | 9/2002 | Sasaki | | |
| 2002/0057941 A1 | 5/2002 | Nakajima et al. | | |
| 2002/0149202 A1 | 10/2002 | Tatsuta et al. | | |

(Continued)

FOREIGN PATENT DOCUMENTS

JP    08-110187 A    4/1996

(Continued)

OTHER PUBLICATIONS

PCT International Search Report mailed Sep. 21, 2009, International Application No. PCT/US2009/033146.

*Primary Examiner* — Tho V Duong
(74) *Attorney, Agent, or Firm* — Kilpatrick Townsend & Stockton LLP

(57) ABSTRACT

According to the invention, a heat exchanger is disclosed. The heat exchanger may include a first tube sheet, a second tube sheet, a heat exchange tube, a header, and a coupling. The heat exchange tube may be disposed at least partially between the first tube sheet and the second tube sheet, and may also be made of a first material. The header may be made of a second material. The coupling may include a first end and a second end. The first end may be made of the first material, and the second end may be made of the second material. The first end may be operably coupled with the heat exchange tube, and the second end may be operably coupled with the header.

16 Claims, 1 Drawing Sheet

U.S. PATENT DOCUMENTS

| | | |
|---|---|---|
| 2007/0001446 A1 | 1/2007 | Shinhama et al. |
| 2007/0080536 A1 | 4/2007 | Park |
| 2007/0205598 A1 | 9/2007 | Katoh et al. |
| 2007/0257488 A1 | 11/2007 | Jimenez |
| 2007/0284086 A1 | 12/2007 | Matter et al. |

FOREIGN PATENT DOCUMENTS

| | | |
|---|---|---|
| JP | 10-281590 A | 10/1998 |
| JP | 2003-166791 A | 6/2003 |
| JP | 2007-046663 A | 2/2007 |
| KR | 10-1996-0001709 A | 1/1996 |

\* cited by examiner

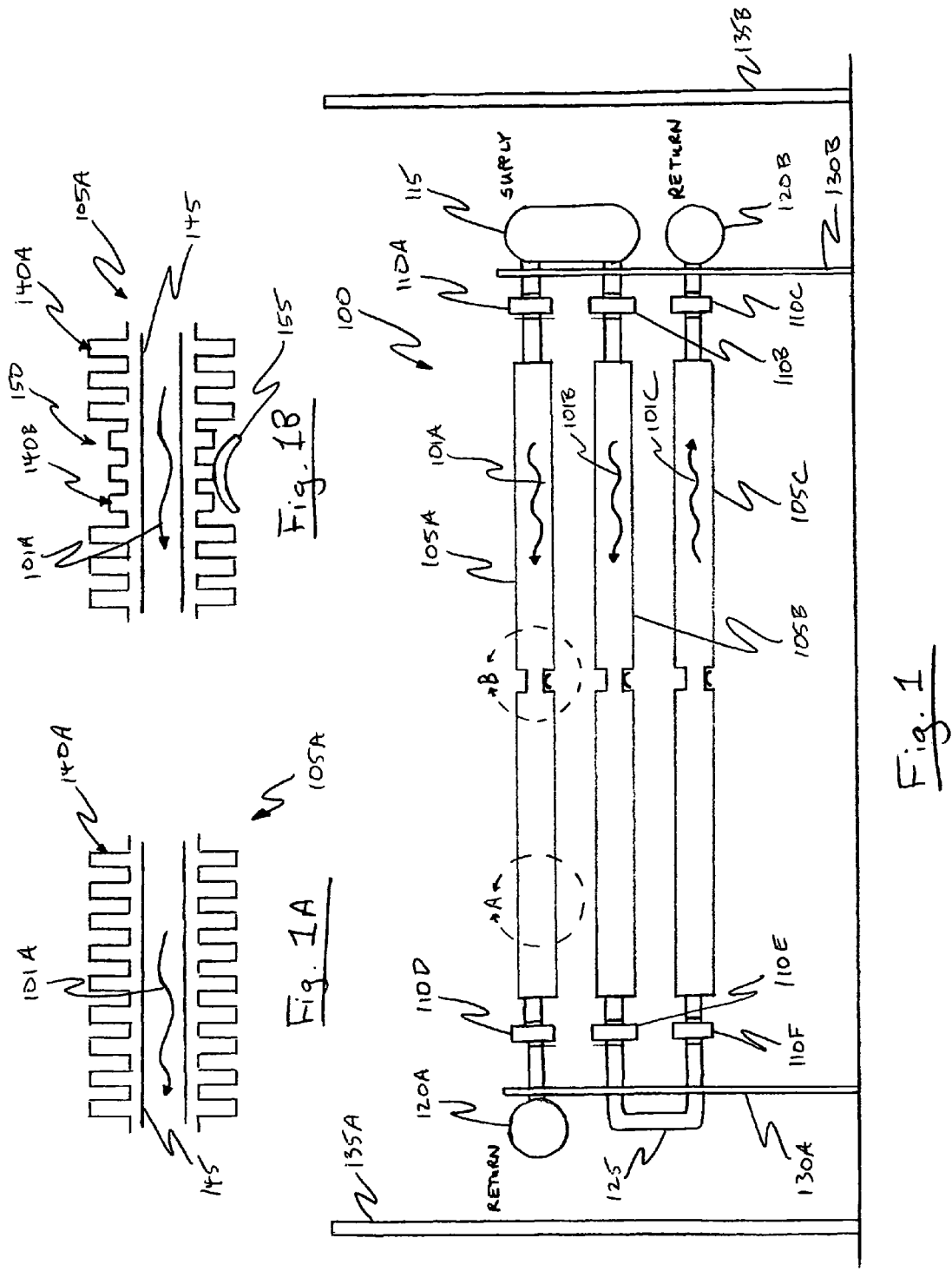

HEAT EXCHANGER

BACKGROUND OF THE INVENTION

This invention relates generally to heat exchangers. More specifically the invention relates to cooling systems in food processing operations.

Heat exchangers employed in the food processing industry not only must efficiently transfer heat between two substances, like all heat exchangers, but must also do so in a manner which satisfies sanitary regulations relevant to food processing. Such regulations include 21 C.F.R. §110.40(b) which requires that seams on food-contact surfaces be smooth to minimize the accumulation of food particles, dirt and other matter. Other regulations such as 21 C.F.R. §110.40 (a) require that the materials used for such surfaces be able to withstand normal use, as well as the usual and considerable amount of cleaning and/or sanitizing common in such applications.

Because of these sanitary concerns, and also because of the relative physical surface complexity of some mechanical components used in relation to heat exchangers, such mechanical components must usually be sealed from food processing areas. This may require the use of conventional polymer seals which can degrade over time, and even possibly contaminate contacted food products. Embodiments of the present invention provide solutions to these and other problems.

BRIEF DESCRIPTION OF THE INVENTION

In one embodiment, a heat exchanger is provided. The heat exchanger may include a first tube sheet, a second tube sheet, a heat exchange tube, a header, and a coupling. The heat exchange tube may be disposed at least partially between the first tube sheet and the second tube sheet, and may also be made of a first material. The header may be made of a second material. The coupling may include a first end and a second end. The first end may be made of the first material, and the second end may be made of the second material. The first end may be operably coupled with the heat exchange tube, and the second end may be operably coupled with the header.

In another embodiment, a method for manufacturing a heat exchanger is provided. The method may include providing a first tube sheet having a first opening. The method may also include providing a second tube sheet. The method may further include providing a heat exchange tube made from a first material. The method may additionally include inserting the heat exchanger at least partially through the first opening. The method may moreover include providing a header made from a second material. The method may also include providing a coupling, where the coupling includes a first end and a second end. The first end may be made from the first material. The second end may be made from the second material. The method may further include operably coupling the heat exchange tube with the first end of the coupling. The method may additionally include operably coupling the header with the second end of the coupling, at least partially through the first opening.

In another embodiment, a heat exchanger is provided. The heat exchanger may include a first means, a second means, a third means, a fourth means, and a fifth means. The first means may be for exchanging heat between a first fluid and a second fluid. The second means may be for supporting the first means. The third means may be for providing the first fluid. The fourth means may be for coupling the first means with the third means to provide the first fluid to the first means. The fifth means may be for directing the second fluid over at least the first means and the fourth means. The first means may, merely by way of example include a heat exchange tube. The second means may, merely by way of example, include a tube wall and/or a support member. The third means may, merely by way of example, include a header. The fourth means may, merely by way of example, include a coupling. The fifth means may, merely by way of example, include a flow channel.

BRIEF DESCRIPTION OF THE DRAWINGS

The present invention is described in conjunction with the appended figures:

FIG. 1 is side view of one embodiment of a heat exchanger of the invention;

FIG. 1A is a close-up view of a sectioned portion of the heat exchanger from FIG. 1; and FIG. 1B is a close-up view of another sectioned portion of the heat exchanger from FIG. 1.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof.

In one embodiment of the invention, a heat exchanger is provided. The heat exchanger may include a first tube sheet, a second tube sheet, a heat exchange tube, a header, and a coupling.

The heat exchange tube may be disposed at least partially between the first tube sheet and the second tube sheet, and may also be made of a first material. In an exemplary embodiment, the first material may be aluminum. In other embodiments, the first material may be another material. For the purposes of example only, the first material will be assumed to be aluminum for the purposes of discussion throughout this specification, with it being understood that other materials may be employed for the first material throughout the discussion herein. The tube sheets may each also be made from either the first material, the second material, or a third material.

In some embodiments, the heat exchange tube may be made from multiple components. Merely by way of example, fins may be press fit onto a tube to form the heat exchanger. However, in an exemplary embodiment, the heat exchange tube may be machined or otherwise manufactured, perhaps by casting, as a single piece. This will eliminate interfaces between the fins and the center tube portion of the heat exchange tube, thereby increasing thermal heat transfer. The fins may be of any shape configured to improve thermal heat exchange between a primary fluid outside the heat exchange tube and a heat exchange fluid within the heat exchange tube.

The header may be made of a second material. In an exemplary embodiment, the second material may be stainless steel. In other embodiments, the second material may be another material. For the purposes of example only, the second material will be assumed to be stainless steel for the purposes of discussion throughout this specification, with it being understood that other materials may be employed for the second material throughout the discussion herein.

In some embodiments, the header may include manifolds, piping and other components, and may be generally understood to include the piping from the coupling to the source/return for the heat exchange fluid to be run through the heat exchange tube. Merely by way of example, a header pipe may be coupled with the coupling and further run/connect to a header manifold.

The heat exchange fluid could include any fluid known in the art to provide excellent thermal heat transfer capabilities. For example, in some embodiments, propylene glycol may be the heat exchange fluid.

The coupling may include a first end and a second end. The first end may be made of the first material, and the second end may be made of the second material. The first end may be operably coupled with the heat exchange tube, and the second end may be operably coupled with the header.

In some embodiments, the coupling may include a bimetallic coupling. Merely by way of example, the first material and the second material may match the materials previously described for the heat exchange tube and the header. Thus, the first material may include aluminum, and the second material may include stainless steel. The heat exchange tube may be made from aluminum, and it may be welded or joined through other procedures known in the art with the aluminum side of the coupling. The header may be made from stainless steel, and it may be welded or joined through other procedures known in the art with the stainless steel side of the coupling.

The heat exchange tube, with couplings at one or more ends may be disposed between the tube sheets, and possibly being at least partially supported by each tube sheet by openings there-through. These opening may be larger than absolutely necessary to accommodate the portion of the header, and any open interface between two sides of a tube sheet may or may not be sealed. If sealed, seals known in the art such as polymer seals may be employed.

In some embodiments, one or more of the couplings coupled with the heat exchange tube may be disposed entirely or partially between the first tube sheet and the second tube sheet. In other embodiments, one or more of the coupling coupled with the heat exchange tube may be disposed entirely or partially outside the area between the first tube sheet and the second tube sheet.

In some embodiments, the heat exchanger and/or other related systems may also include a flow channel surrounding the heat exchanger. The flow channel may be made from the first material, the second material, or a third material, and may direct a primary fluid over the heat exchange tube so that the primary fluid and the heat exchange fluid running through the heat exchange tube may exchange heat. This process may be used to either cool or heat the primary fluid. In some embodiments, the flow channel may be a stationary container which is filled and emptied around the heat exchanger. Thus, the flow channel may allow the primary fluid to run over the heat exchanger as it moves through a process, or the flow channel may allow the primary fluid to sit around the heat exchanger, with natural convection within the primary fluid moving the primary fluid over the heat exchanger. In some embodiments, the primary fluid may also surround the coupling(s) and/or header(s) of the heat exchanger, causing some additional thermal heat transfer to occur at those components as well.

In some embodiments, the heat exchange tube may be supported at other locations besides the tube sheets. Merely by way of example, and especially in embodiments where the heat exchange tube is lengthy, support members may support the heat exchange tube in locations not proximate to the ends of the heat exchange tube. In some embodiments, the fins of the heat exchange tube in the locations supported may have different dimensions than other fins of the heat exchange tube. This may allow for a better support surface to be presented to the support member, as well as allow for tighter spacing of multiple heat exchange tubes in embodiments where multiple heat exchange tubes are present (for example, by "honeycombing" multiple heat exchange tubes in close proximity with each other).

Though the embodiments discussed above are explicitly in reference to a single heat exchange tube heat exchanger, it is implicit that the same structures could be used in multi heat exchange tube heat exchangers. In these embodiments, instead of one heat exchange tube having a single supply header and return header at each end of the heat exchange tube, multiple heat exchange tubes may feed in-parallel from one or more supply headers and deposit into one or more return headers. In some embodiments, multiple heat exchange tubes may form a single circuit, with a first heat exchange tube feeding from a supply header, and consequently feeding one or more additional heat exchange tubes in series before returning the heat exchange fluid to a return header. In some embodiments, both parallel and series circuits may be employed to create the heat exchanger. When multiple heat exchange tubes are coupled in series, piping made from the second material (stainless steel in the example above), may be used to couple the heat exchange tubes via the couplings described above.

In another embodiment of the invention, a method for manufacturing a heat exchanger is provided. The method may include providing a first tube sheet having a first opening. The method may also include providing a second tube sheet. The method may further include providing a heat exchange tube made from a first material. As discussed above, the heat exchange tube may be machined or otherwise fabricated from and into a single piece to improve thermal heat transfer. The method may moreover include providing a header made from a second material.

The method may additionally include inserting the header at least partially through the first opening. The method may also include providing a coupling, where the coupling includes a first end and a second end. The first end may be made from the first material. The second end may be made from the second material.

The method may further include operably coupling the heat exchange tube with the first end of the coupling. In some embodiments, this may include disposing the coupling entirely between the first tube sheet and the second tube sheet. The method may additionally include operably coupling the header with the second end of the coupling, at least partially through the first opening.

In some embodiments, the method may also include providing a flow channel configured to direct a fluid over the heat exchange tube. As discussed above, the flow channel may be a primarily transient flow channel, or a primarily stationary fluid container. As above, the flow channel may direct the fluid over the couplings as well as at least portions of the header(s).

As discussed above, in some embodiments, any number of heat exchange tubes may be employed by a given heat exchanger system. In some embodiments, various heat exchange tubes may operate either in series, parallel, or combinations of both. Supply and return headers, as well as joint piping, made from the second material may be coupled with the heat exchange tubes via the couplings described to complete the circuits of the system.

In another embodiment of the invention, a heat exchanger is provided. The heat exchanger may include a first means, a second means, a third means, a fourth means, and a fifth means. The first means may be for exchanging heat between a first fluid and a second fluid. The second means may be for supporting the first means. The third means may be for providing the first fluid. The fourth means may be for coupling the first means with the third means to provide the first fluid to the first means. The fifth means may be for directing the second fluid over at least the first means and the fourth means.

The first means may, merely by way of example include a heat exchange tube, any of the other components described herein, and/or any components known or developed in the art for the appropriate function.

The second means may, merely by way of example, include a tube wall and/or a support member, any of the other components described herein, and/or any components known or developed in the art for the appropriate function.

The third means may, merely by way of example, include a header, any of the other components described herein, and/or any components known or developed in the art for the appropriate function.

The fourth means may, merely by way of example, include a coupling, any of the other components described herein, and/or any components known or developed in the art for the appropriate function.

The fifth means may, merely by way of example, include a flow channel, any of the other components described herein, and/or any components known or developed in the art for the appropriate function.

Turning now to FIG. 1, a one possible example heat exchanger 100 of the invention is shown. Heat exchanger 100 includes three heat exchange tubes 105, six couplings 110, one supply header 115, and two return headers 120. A connector pipe 125 is also present, as well as tube sheets 130. A flow channel is also formed by flow channel walls 135.

In the first circuit of heat exchanger 100, supply 115 provides heat exchange fluid to heat exchange tube 105A via coupling 110A. After exchanging thermal energy with the primary fluid flowing through the flow channel, the heat exchange fluid may exit heat exchange tube 110A and enter return header 120A via coupling 110D. The flow of the heat exchange fluid is shown by arrow 101A.

In the second circuit of heat exchanger 100, supply 115 provides heat exchange fluid to heat exchange tube 105B via coupling 110B. After exchanging thermal energy with the primary fluid flowing through the flow channel, the heat exchange fluid may exit heat exchange tube 110B and enter heat exchange tube 105C via connector pipe 125 and couplings 110E, 110F. After exchanging thermal energy at heat exchange tube 105C with the primary fluid flowing through the flow channel, the heat exchange fluid may exit heat exchange tube 110C and enter return header 120B via coupling 110C. The flow of the heat exchange fluid is shown by arrows 101B, 101C.

As discussed above, in some embodiments, all heat exchange pipes may be in parallel to each other (for example, an embodiment with multiple copies of the first circuit discussed above in regards to FIG. 1). In other embodiments, there may be multiple series circuits in parallel with each other (for example, an embodiment with multiple copies of the second circuit discussed above in regards to FIG. 1). In yet other embodiments, multiple configurations may exist in the same heat exchanger.

Also shown in FIG. 1A is a close up view of a sectioned portion of heat exchange tube 105A (detail 'A' from FIG. 1). FIG. 1A shows how heat exchange tube 105A may be made from a single piece, possibly via machining, thereby integrating the fins 140 with the heat exchange fluid conduit 145, and increasing thermal heat transfer from other designs.

FIG. 1B shows a close up of another sectioned portion of heat exchange tube 105A (detail 'B' from FIG. 1). FIG. 1B shows how meat exchange tube 105A may be supported near its center by a support member 155. By adjusting the dimensions of fins 140B from their normal dimensions (as with fins 140A), through-spaces 150 may allow for support member 155 to pass through through-spaces 150 and support heat exchange tube 105A, as well as other heat exchange tubes parallel with or "honeycombed" nearby.

In FIG. 1B for example, the lower through-space 150 allows support member 155 to pass through and support heat exchange tube 105A. Other heat exchange tubes at the same elevation may likewise be supported by support member 155. Support member 155 is in turn supported by another mechanical structure such as a support column (not shown for clarity on FIG. 1).

Through-space 150 on the top side of heat exchange tube 105A may allow for another support member to pass through and support nearby heat exchange tubes. If the through-space 150 on the top side of heat exchange 105A were not provided, a "honeycomb" of heat exchangers could not be as densely packed. Therefore, if all heat exchange tubes in a given heat exchanger are manufactured with the same through-spaces, a densely packed "honeycomb" of heat exchange tubes may be provided to improve thermal heat exchange than less dense packages.

The invention has now been described in detail for the purposes of clarity and understanding. However, it will be appreciated that certain changes and modifications may be practiced within the scope of the appended claims.

What is claimed is:

1. A heat exchanger, wherein the heat exchanger comprises:
   a first tube sheet;
   a second tube sheet;
   a heat exchange tube, wherein:
      the heat exchange tube is disposed at least partially between the first tube sheet and the second tube sheet; and
      the heat exchange tube is comprised of a first material;
   a header, wherein the header is comprised of a second material; and
   a coupling, wherein:
      the coupling comprises a first end and a second end;
      the coupling comprises a bimetallic coupling;
      the first end is comprised of the first material;
      the second end is comprised of the second material;
      the first end is operably coupled with the heat exchange tube; and
      the second end is operably coupled with the header.

2. The heat exchanger of claim 1, wherein:
   the first material comprises aluminum; and
   the second material comprises stainless steel.

3. The heat exchanger of claim 1, wherein the coupling is disposed entirely between the first tube sheet and the second tube sheet.

4. The heat exchanger of claim 1, wherein the first tube sheet defines an opening, and wherein the header penetrates the first tube sheet through the opening.

5. The heat exchanger of claim 4, wherein an interface between the first tube sheet and the header at the opening is not sealed.

6. The heat exchanger of claim 1, wherein the heat exchanger further comprises a flow channel, wherein the flow channel directs a fluid over the heat exchange tube.

7. The heat exchanger of claim 6, wherein the flow channel further directs the fluid over the coupling.

8. The heat exchanger of claim 6, wherein the flow channel further directs the fluid over at least a portion of the header.

9. The heat exchanger of claim 1, wherein the heat exchange tube consists of a single piece having a plurality of fins.

10. The heat exchanger of claim 1, wherein:
    the heat exchange tube comprises a plurality of fins, wherein the plurality of fins comprises a first set of fins and a second set of fins, wherein:
       each of the first set of fins is characterized by a first set of dimensions; and
       each of the second set of fins is characterized by a second set of dimensions, wherein the second set of dimensions is different from the first set of dimensions; and
    the heat exchanger further comprises a support member supporting the heat exchange tube by the second set of fins.

11. A method for manufacturing a heat exchanger, wherein the method comprises:
    providing a first tube sheet having a first opening;
    providing a second tube sheet;
    providing a heat exchange tube comprised of a first material;
    providing a header comprised of a second material;
    inserting the header at least partially through the first opening;
    providing a coupling, wherein:
       the coupling comprises a first end and a second end;
       the coupling comprises a bimetallic coupling;
       the first end is comprised of the first material; and
       the second end is comprised of the second material;
    coupling, operably, the heat exchange tube with the first end of the coupling; and
    coupling, operably, the header with the second end of the coupling, at least partially through the first opening.

12. The method for manufacturing a heat exchanger of claim 11, wherein the coupling, operably, the heat exchange tube with the first end of the coupling comprises disposing the coupling entirely between the first tube sheet and the second tube sheet.

13. The method for manufacturing a heat exchanger of claim 11, wherein the method further comprises providing a flow channel configured to direct a fluid over the heat exchange tube.

14. The method for manufacturing a heat exchanger of claim 12, wherein the flow channel is further configured to direct the fluid over the coupling.

15. The method for manufacturing a heat exchanger of claim 12, wherein the flow channel is further configured to direct the fluid over at least a portion of the header.

16. The method for manufacturing a heat exchanger of claim 11, wherein providing the heat exchange tube consists of a single piece having a plurality of fins.

* * * * *